United States Patent
Bhat et al.

(10) Patent No.: US 11,295,728 B2
(45) Date of Patent: Apr. 5, 2022

(54) METHOD AND SYSTEM FOR IMPROVING RECOGNITION OF DISORDERED SPEECH

(71) Applicant: Tata Consultancy Services Limited, Mumbai (IN)

(72) Inventors: Chitralekha Ganapati Bhat, Thane (IN); Bhavikkumar Bhagvanbhai Vachhani, Thane (IN); Sunilkumar Kopparapu, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 265 days.

(21) Appl. No.: 16/555,390

(22) Filed: Aug. 29, 2019

(65) Prior Publication Data
US 2020/0074987 A1    Mar. 5, 2020

(30) Foreign Application Priority Data
Aug. 30, 2018   (IN) .............................. 201821032635

(51) Int. Cl.
*G10L 15/07* (2013.01)
*G10L 15/02* (2006.01)
*G10L 15/22* (2006.01)

(52) U.S. Cl.
CPC .............. *G10L 15/07* (2013.01); *G10L 15/02* (2013.01); *G10L 15/22* (2013.01); *G10L 2015/223* (2013.01)

(58) Field of Classification Search
None
See application file for complete search history.

(56) References Cited

U.S. PATENT DOCUMENTS

| 7,925,508 | B1 * | 4/2011 | Michaelis | ............... G10L 17/26 600/300 |
| 8,682,678 | B2 * | 3/2014 | Malkin | ................... G10L 21/00 704/278 |
| 10,395,649 | B2 * | 8/2019 | Li | ......................... G10L 15/187 |
| 2007/0124135 | A1 * | 5/2007 | Schultz | .................. G10L 17/26 704/201 |
| 2008/0151769 | A1 * | 6/2008 | El-Hennawey | ..... H04M 3/2236 370/252 |
| 2008/0300867 | A1 * | 12/2008 | Yan | ........................ G10L 25/90 704/207 |

(Continued)

OTHER PUBLICATIONS

Oung QW, Muthusamy H, Basah SN, Lee H, Vijean V. Empirical wavelet transform based features for classification of Parkinson's disease severity. Journal of medical systems. Feb. 1, 2018;42(2):29. (Year: 2018).*

(Continued)

*Primary Examiner* — Jonathan C Kim
(74) *Attorney, Agent, or Firm* — Finnegan, Henderson, Farabow, Garrett & Dunner LLP

(57) ABSTRACT

This disclosure relates generally to speech signal processing, and more particularly to method and system for improving recognition of disordered speech. In one embodiment, a method and a system for identifying extent of deviation in speech utterances of a user from a normal level, caused due to such impairments are provided. The system further makes appropriate modifications to generate utterances pertaining to healthy speech. This data may be fed as input to the speech recognition systems, as those systems can interpret the corrected data.

6 Claims, 4 Drawing Sheets

(56) References Cited

U.S. PATENT DOCUMENTS

| | | | |
|---|---|---|---|
| 2009/0119109 A1* | 5/2009 | Willmann | G09B 19/04 704/271 |
| 2009/0191521 A1* | 7/2009 | Paul | A61B 5/165 600/300 |
| 2010/0174533 A1* | 7/2010 | Pakhomov | G10L 15/005 704/271 |
| 2012/0116772 A1* | 5/2012 | Jones | G10L 25/00 704/E11.001 |
| 2013/0246061 A1* | 9/2013 | Malkin | G10L 21/00 704/227 |
| 2014/0255887 A1* | 9/2014 | Xu | A61B 5/168 434/169 |
| 2014/0379348 A1* | 12/2014 | Sung | G10L 25/60 704/254 |
| 2015/0058013 A1* | 2/2015 | Pakhomov | G10L 25/87 704/243 |
| 2015/0318002 A1* | 11/2015 | Karam | A61B 5/4803 704/231 |
| 2016/0366274 A1* | 12/2016 | Yang | H04M 3/22 |
| 2017/0053665 A1* | 2/2017 | Quatieri, Jr. | G16H 50/70 |
| 2017/0084266 A1* | 3/2017 | Bronakowski | G10L 13/00 |
| 2017/0221336 A1* | 8/2017 | Ogaz | G10L 25/66 |
| 2018/0197439 A1* | 7/2018 | Gordon | G09B 19/04 |
| 2018/0286430 A1* | 10/2018 | Shapira | A61B 5/7282 |
| 2018/0366144 A1* | 12/2018 | Ashoori | G16H 40/63 |
| 2019/0362740 A1* | 11/2019 | Hauptman | A61B 5/4803 |
| 2020/0074987 A1* | 3/2020 | Bhat | G10L 15/22 |
| 2020/0126557 A1* | 4/2020 | Lee | G10L 15/22 |
| 2020/0178883 A1* | 6/2020 | Toh | G10L 15/25 |
| 2020/0211568 A1* | 7/2020 | Panda | G10L 17/02 |
| 2021/0202096 A1* | 7/2021 | Treger | G10L 15/063 |

OTHER PUBLICATIONS

Kim J. C., Rao H, Clements MA. Speech intelligibility estimation using multi-resolution spectral features for speakers undergoing cancer treatment. The Journal of the Acoustical Society of America. Oct. 25, 2014;136(4):EL315-21. (Year: 2014).*

* cited by examiner

METHOD AND SYSTEM FOR IMPROVING RECOGNITION OF DISORDERED SPEECH

PRIORITY CLAIM

This U.S. patent application claims priority under 35 U.S.C. § 119 to: India Application No. 201821032635, filed on Aug. 30, 2018. The entire contents of the aforementioned application are incorporated herein by reference.

TECHNICAL FIELD

This disclosure relates generally to speech signal processing, and more particularly to a method and system for improving recognition of disordered speech.

BACKGROUND

Speech recognition or Automatic Speech Recognition (ASR) is a mechanism which enables recognition and translation of spoken languages into text, using a system (a computer). Such systems may be 'trained' to recognize speech, by feeding appropriate training data to the system. ASR has applications in different areas. For example, the voice recognition allows a user to provide voice commands/inputs to a system (for example, a mobile phone, or an in-car infotainment system with voice recognition capability and so on).

The inventors here have recognized several technical problems with such conventional systems, as explained below. While the existing systems with voice recognition may work well with normal (unimpaired) speech, such systems have a disadvantage that they, to certain extent, fail to recognize impaired speech. As a result, people having speech disorders find it difficult to use such gadgets having voice input provision, as the gadgets may not recognize the user commands at all or may wrongly interpret the user commands.

SUMMARY

Embodiments of the present disclosure present technological improvements as solutions to one or more of the above-mentioned technical problems recognized by the inventors in conventional systems. For example, in one embodiment, a processor-implemented method is disclosed. In this method, at least one speech utterance of a user is obtained as input, via one or more hardware processors, and then the obtained at least one speech utterance is processed via the one or more hardware processors. Processing of the at least one speech utterance comprises of: comparing the obtained at least one speech utterance with at least one deviation model; determining a deviation level of the at least one speech utterance, based on the comparison with the at least one deviation model; determining at least one speech modification matching the determined deviation level of the at least one speech utterance; and modifying the obtained speech utterance in all the locations of the deviations, using the determined at least one speech modification. The deviation level comprises of: at least one types of deviation present in the at least one speech utterance; extent of deviation of the at least one speech utterance from the at least one deviation model; and locations of all the deviations in the at least one speech utterance.

In another embodiment, a system is provided. The system includes one or more communication interfaces; one or more hardware processors; and one or more memory modules storing a plurality of instructions. The plurality of instructions, when executed, cause the one or more hardware processors to: obtain at least one speech utterance a user as input; and process the obtained at least one speech utterance. Processing of the at least one speech utterance involves: comparing the obtained at least one speech utterance with at least one deviation model; determining a deviation level of the at least one speech utterance, based on the comparison with the at least one deviation model; determining at least one speech modification matching the determined deviation level of the at least one speech utterance; and modifying the obtained speech data in all the locations of the deviations, using the determined at least one speech modification. The deviation level comprises of: at least one types of deviation present in the at least one speech utterance; extent of deviation of the at least one speech utterance from the at least one deviation model; and locations of all the deviations in the at least one speech utterance.

In yet another embodiment, a non-transitory computer readable medium is provided. The non-transitory computer readable medium includes one or more communication interfaces; one or more hardware processors; and one or more memory modules storing a plurality of instructions. The plurality of instructions, when executed, cause the one or more hardware processors to: obtain at least one speech utterance a user as input; and process the obtained at least one speech utterance. Processing of the at least one speech utterance involves: comparing the obtained at least one speech utterance with at least one deviation model; determining a deviation level of the at least one speech utterance, based on the comparison with the at least one deviation model; determining at least one speech modification matching the determined deviation level of the at least one speech utterance; and modifying the obtained speech data in all the locations of the deviations, using the determined at least one speech modification. The deviation level comprises of: at least one types of deviation present in the at least one speech utterance; extent of deviation of the at least one speech utterance from the at least one deviation model; and locations of all the deviations in the at least one speech utterance.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
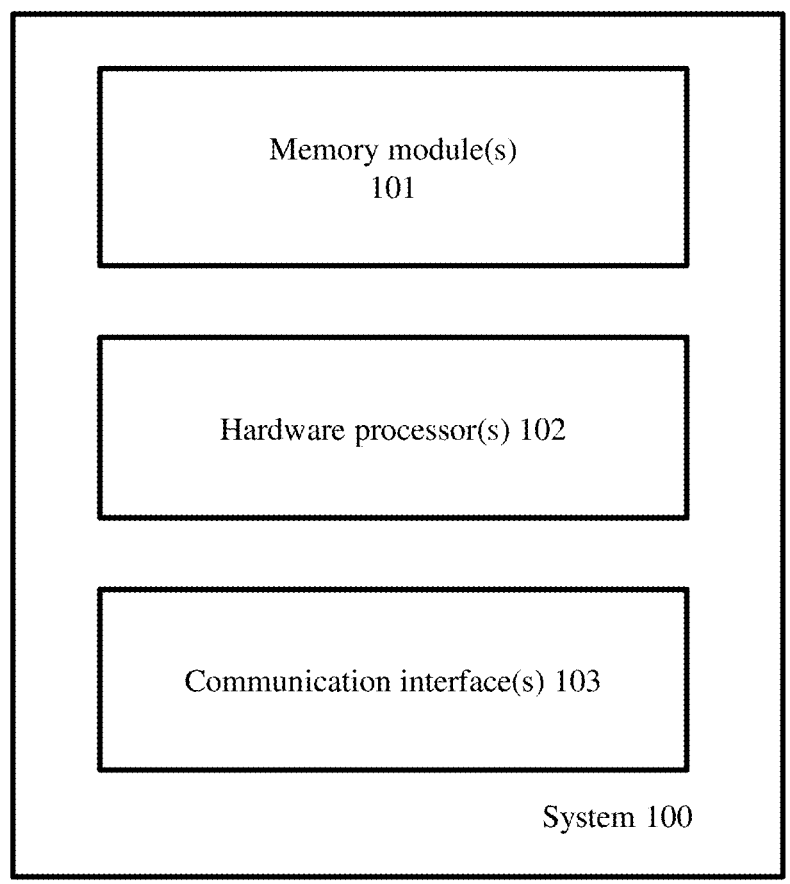
FIG. 1 illustrates an exemplary system for speech signal processing, according to some embodiments of the present disclosure.

FIG. 1 illustrates an exemplary system for speech signal processing, according to some embodiments of the present disclosure. The system (100) includes one or more memory module (101), one or more hardware processor (102), and one or more communication interfaces. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The one or more communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101. The memory module(1) 101 stores a plurality of instructions which when executed, cause the one or more hardware processors 102 to perform one or more actions associated with the speech data processing being handled by the system 100.

The system 100 is configured to store in one or more of the memory modules 101, at least one deviation model comprising feature vectors representing degree of deviation of speech signals at different levels of at least one speech disorder. For example, consider dysarthria which is a speech disorder. When multiple users affected by dysarthria are considered, severity level of dysarthria may vary from one user to other. While one user is mildly affected with dysarthria (mild dysarthria), another user may be severely affected (severe dysarthria). Each of the deviation models may store feature vectors corresponding to degree of deviation of speech signal for the mild dysarthria and/or feature vectors corresponding to degree of deviation of speech signal for the severe dysarthria. Similar way, the deviation models can store feature vectors representing degree of deviation of speech signals at different levels of other diseases as well. The deviation models serve as reference databases which the system 100 can use while processing one or more speech utterance data collected in real-time.

The system 100 collects at least one speech utterance data from at least one user at once. Number of speech signals that can be collected and process simultaneously by the system 100 may vary based on implementation standards and requirements. Further, the system 100 may be able to process speech signals from different users who are affected by different speech disorders, simultaneously. For the purpose of explaining the speech signal processing being carried out by the system 100, speech utterance obtained from a single user is considered. However, this does not intent to impose any restriction on capabilities of the system 100 or scalability of the system 100.

For ease of processing, the system 100 may split the obtained speech utterance data to multiple smaller components, in terms of one or more pre-defined criteria such as length, time and so on. The system 100 then compares the speech utterance data with the one or more deviation models. In an embodiment, one or more deviation models matching the obtained speech utterance maybe selected by the system 100. For example, consider that a deviation model out of a plurality of available deviation models stores dysarthria specific data. If the system 100 identifies that user of the obtained speech utterance is suffering from dysarthria (by analyzing the speech signals or based on a manual input fed to the system 100), then the system 100 picks the aforementioned deviation model in which dysarthria specific data is stored. By comparing the obtained speech utterance with the one or more deviation models, the system 100 determines at least one deviation model corresponding to the obtained speech utterance. Based on the determined at least one determined deviation model, the system 100 identifies extent of deviation of the at least one speech utterance from a (normal) healthy speech, and type of deviation (i.e. type of speech disorder). In addition to the extent of deviation and type, the system 100 identifies all locations in the at least one speech utterance, where the deviations are present. In an embodiment, the system identifies all the 'locations' where the deviations are present, by checking for the deviations throughout the length of the speech utterance obtained from the user. The type of deviation, the extent of deviation, and the locations are collectively identified as a 'deviation level' of the obtained at least one speech utterance, by the system 100.

The system 100 further determines at least one speech modification matching the determined at least one deviation level of the obtained speech utterance. In an embodiment, each 'speech modification' maybe a set of action items/guidelines which is to be executed by the system 100 on the obtained speech utterance, so as to generate a healthy speech out of the obtained speech utterance (wherein the obtained speech utterance corresponds to an impaired speech, as indicated by the extent of deviation). The system 100 further applies the determined at least one speech modification on the speech utterance. In an embodiment, the system 100 applies the at least one speech modification, at all locations of the speech utterance where the deviation has been identified. For example, consider a user who is affected by a speech disorder due to which he/she is unable to pronounce a specific phone (say '/p/'). In the obtained speech utterance, there may be numerous occurrences of '/p/P'. The system 100, while modifying the speech utterance, identifies all instances of occurrence of '/p/' (and locations in the speech utterance), and applies appropriate correction at the identified locations.

Figure 2:
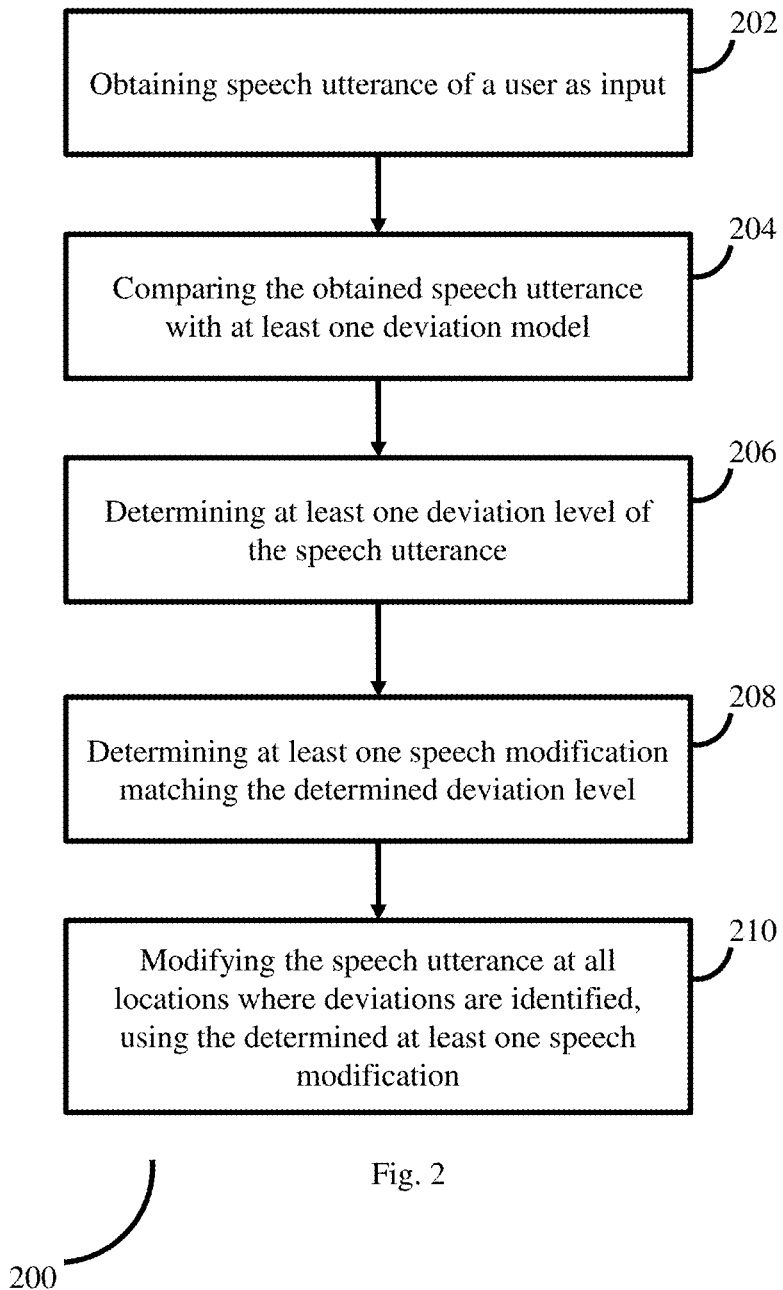
FIG. 2 is a flow diagram depicting steps involved in the process of speech signal processing, using the system of FIG. 1, according to some embodiments of the present disclosure.

FIG. 2 is a flow diagram depicting steps involved in the process of speech signal processing, using the system of FIG. 1, according to some embodiments of the present disclosure. At least one speech utterance from at least one user is obtained (202) as input by the system 100. The system 100 then compares (204) the speech utterance data with the one or more deviation models. By comparing the obtained speech utterance with the one or more deviation models, the system 100 determines at least one deviation model corresponding to the obtained speech utterance. Based on the determined at least one deviation model, the system 100 identifies extent of deviation of the at least one speech utterance from a (normal) healthy speech, and type of deviation (i.e. type of speech disorder). In addition to the extent of deviation and type, the system 100 identifies all locations in the at least one speech utterance, where the deviations are present. The system 100 then determines (206) a deviation level of the obtained at least one speech utterance, wherein the type of deviation, the extent of deviation, and the locations collectively represent the deviation level.

Further, the system 100 determines (208) at least one speech modification matching the determined at least one deviation level of the obtained speech utterance, and then applies (210) the determined at least one speech modification on the speech utterance. In an embodiment, the system 100 applies the at least one speech modification, at all locations of the speech utterance where the deviation has been identified. By applying the at least one speech modification on the obtained at least one speech utterance, the system 100 generates a healthy speech data from the obtained (impaired) speech utterance. The example depicted in FIG. 4 shows speech utterance signals at different stages of processing covered in FIG. 3. The waveform in (4a) correspond to speech utterance from the user, which is given as input to the system. At this stage, even though the user says 'merchandize', due to impaired speech, the ASR may recognize/interpret the utterance as 'naturalization'. At (4b), different locations where deviations occur have been identified. (4c) depicts waveform of the signal after applying the one or more 'speech modification(s)'. This signal, when fed to the ASR system as input, identified as allowing the ASR to recognize/interpret the utterance as 'merchandize', which matches the actual user utterance. In various embodiments, different steps in method 200 may be performed in the same order or in any alternate order, as required. In another embodiment, one or more steps in method 200 may be skipped.

Figure 3:
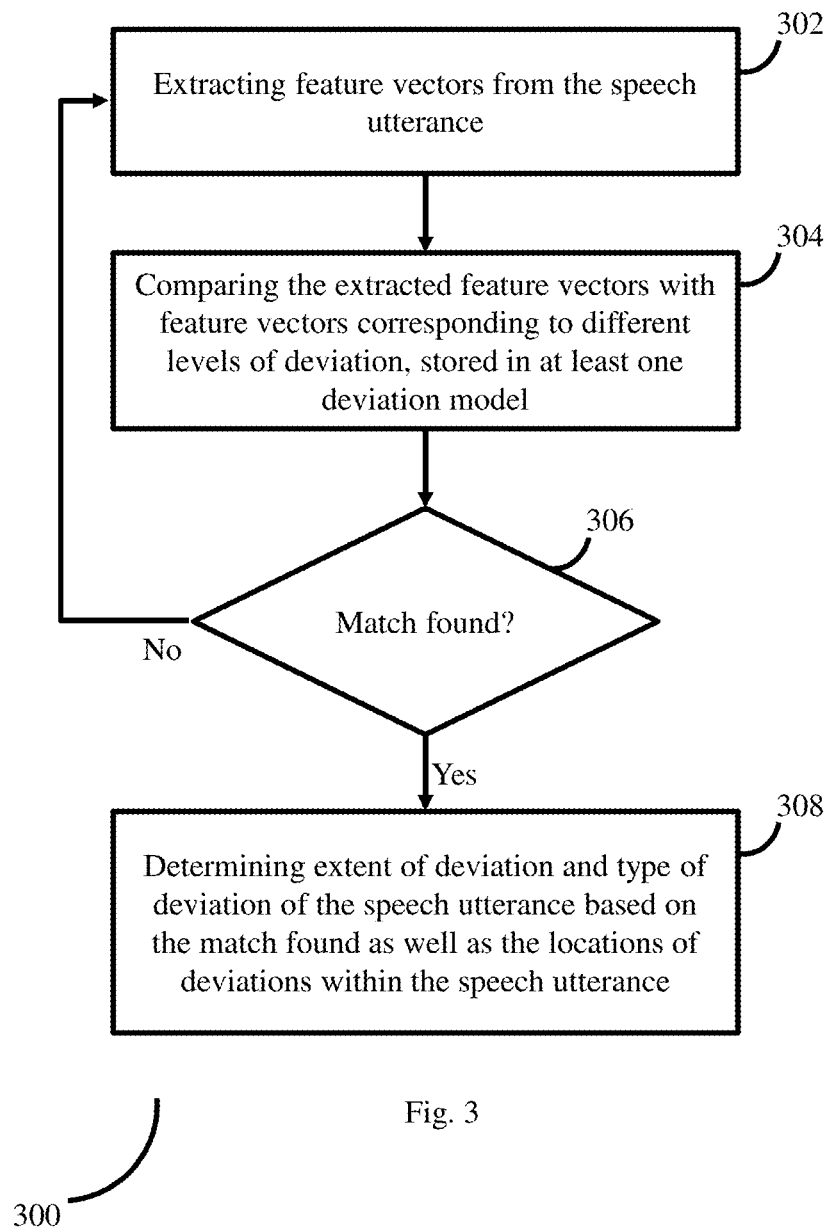
FIG. 3 illustrates a flow diagram depicting steps involved in the process of determining deviation level during the speech signal processing, using the system of FIG. 1, according to some embodiments of the present disclosure.
Figure 4:
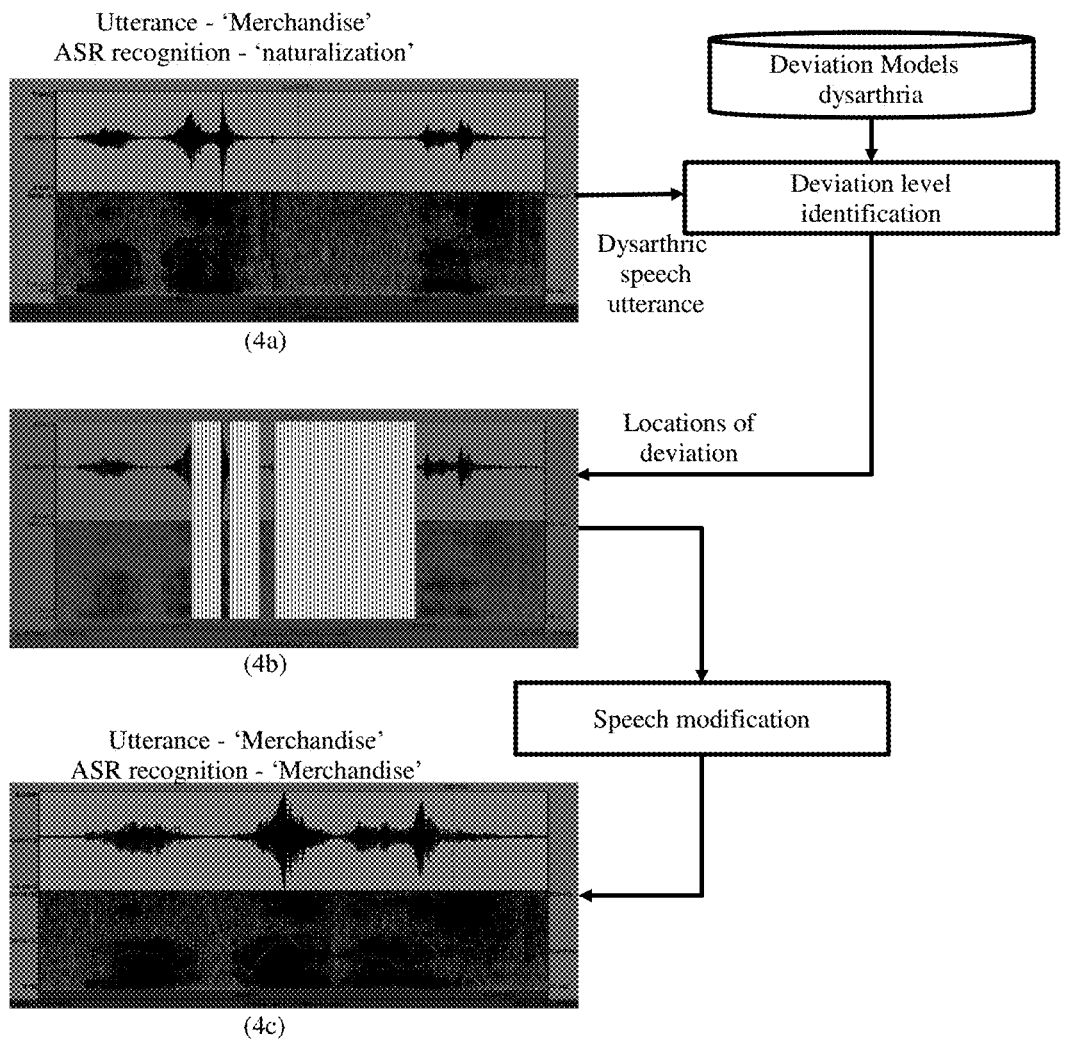
FIG. 4 is an example diagram depicting signal waveforms at different stages of the speech signal processing, using the system of FIG. 1, according to some embodiments of the present disclosure.

FIG. 3 illustrates a flow diagram depicting steps involved in the process of determining deviation level during the speech signal processing, using the system of FIG. 1, in accordance with some embodiments of the present disclosure. The system 100 initially extracts (302) a plurality of feature vectors from the obtained at least one speech utterance, using any known suitable technique. The system 100 identifies at least one deviation model that matches the obtained at least one speech utterance. The deviation model(s) includes feature vectors corresponding to different levels of deviation, of one or more types of speech disorder (i.e. type of deviation). By comparing (304) the extracted feature vectors with feature vectors in the at least one deviation model, the system 100 checks for a match. If a match is found (306), then the system 100 determines (308) an extent of deviation as well as type of deviation of the speech utterance, based on the match found. For example, consider that the feature vectors in the deviation model which are identified as matching the feature vectors of the at least one speech utterance represent mild dysarthria, then the 'type' is 'dysarthria' and extent of deviation is 'mild' (which may also be defined in terms of values, parameters and so on).

In various embodiments, different steps in method 300 may be performed in the same order or in any alternate order, as required. In another embodiment, one or more steps in method 300 may be skipped.

Experimental results:

Consider an example showing effectiveness of the signal processing mechanism disclosed herein, in processing speech utterances having different dysarthric speech levels (severity). Consider that speech utterance from a person affected by dysarthria is being obtained and processed by the system 100, and after assessing deviation level (indicating different severities), two types of enhancements 1. a tempo adaptation carried out in temporal domain, and 2. Deep Auto Encoder (DAE) based Mel Frequency Cepstral Coefficients (MFCC) feature enhancement, as part of modifying the speech utterance in response to the detected deviations, wherein Hybrid Deep Neural Network—Hidden Markov Model (DNN-HMM) model has been used for feature extraction. Different front-end scenarios considered are:

i. MFCC features ii. Tempo adaptation followed by MFCC feature extraction DAE enhanced MFCC features iii. Tempo adaptation followed by DAE enhanced MFCC features ASR performance is reported in terms of Word Error Rates (WER). WERs for each configuration in Table 2 for the relevant front-end scenarios described above can be seen in Table 3.

TABLE 1

(WER for different experimental setups)

| System | MFCC (baseline) | TA-MFCC | MFCC-DAE | TA-MFCC + DAE |
|---|---|---|---|---|
| S-1 | 2.26 | — | 0.00 | — |
| S-2 | 46.89 | 44.25 | 34.51 | 30.71 |
| S-3 | 32.80 | — | 27.85 | — |
| S-4 | 31.59 | 21.30 | 20.14 | 20.69 |

TABLE 2

(WER analysis severity level)

| System | Severity | MFCC (baseline) | TA-MFCC | MFCC-DAE | TA-MFCC + DAE |
|---|---|---|---|---|---|
| S-2 | Very-low | 14.59 | — | 2.86 | — |
|  | Low | 43.79 | 39.27 | 14.41 | 15.41 |
|  | Mid | 67.63 | 60.53 | 60.00 | 48.16 |
|  | High | 82.06 | 80.38 | 78.71 | 71.29 |
| S-4 | Very-low | 12.93 | — | 1.65 | — |
|  | Low | 22.60 | 16.95 | 13.56 | 17.23 |
|  | Mid | 34.47 | 15.79 | 14.47 | 15.79 |
|  | High | 66.27 | 61.24 | 60.29 | 58.61 |

Purpose of S-1 is to examine the impact of DAE on clean or healthy control speech. The WERs for MFCC and MFCC–DAE indicate that DAE-based speech feature enhancement has improved the recognition performance even for healthy-control or clean speech. Significant improvements were seen for all four configurations over the baseline MFCC-based ASR system when enhancements were applied. Although the tandem system showed significant improvement over the baseline (of the order of 16% for S-2) for all configurations, for S-4 the MFCC–DAE seemed to perform the best. When additional dysarthric data was included to the S-2 configuration for training the DAE and DNN-HMM systems, the performance (of S-4) significantly improved across all front-end scenarios. However, the individual front-ends performed on par or slightly better than the tandem front-end. In order to understand this better, performances of S-2 and S-4 were analyzed based on the performances of individual and tandem scenarios at dysarthria severity levels as shown in Table 4.

The tempo adaptation parameter used for very low severity was 1, indicating no adaptation is performed on this set of dysarthric speech. Hence only the MFCC–DAE performance has been reported. The ASR performance across all front-end scenarios reduces with the increase in severity. In majority of the cases, MFCC–DAE provided the best performance or least WER. Values indicate that addition of dysarthric speech to the training data results in significant improvement in the overall performance of S-2 configuration. However, majority of the contribution to this spike in performance comes from the performance improvement for mid and high severity dysarthric speech. Based on the severity level assessment, the tandem system performs best for mid and high severity dysarthric speech while MFCC–DAE gives significant performance gains in case of very low and low severity dysarthric speech. Several iterations with various combinations of data need to be conducted to arrive at an exact recommendation regarding the choice of front-end. However, the tandem system (TA-MFCC+DAE) performed the best or on par with MFCC–DAE in most cases.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
obtaining at least one speech utterance of a user as input, via one or more hardware processors; and
processing the obtained at least one speech utterance, via the one or more hardware processors, comprising:
comparing the obtained at least one speech utterance with at least one deviation model;
determining a deviation level of the at least one speech utterance, based on the comparison with the at least one deviation model, wherein the step of determining the deviation level comprises of:
extracting feature vectors from the obtained at least one speech utterance;
comparing the extracted feature vectors of the at least one speech utterance with feature vectors representing different levels of deviation stored in the at least one deviation model;
identifying a match for the feature vectors of the at least one speech utterance in the at least one deviation model;
identifying at least one type of deviation present in the at least one speech utterance, an extent of deviation of the at least one speech utterance from a healthy speech and locations of all deviations in the at least one speech utterance, based on the identified match; and
determining the deviation level of the at least one speech utterance as the deviation level corresponding to the identified match, wherein the deviation level comprises of:
(a) the identified at least one type of deviation present in the at least one speech utterance, wherein the at least one type of deviation is a type of speech disorder,
(b) the identified extent of deviation of the at least one speech utterance, wherein the at least one deviation model comprises of the feature vectors representing degree of deviation of speech signals at different severity levels of at least one speech disorder, and
(c) the identified locations of all the deviations in the at least one speech utterance;
determining at least one speech modification matching the determined deviation level of the at least one speech utterance; and
modifying the obtained at least one speech utterance in all the locations of the deviations, using the determined at least one speech modification, wherein the at least one speech utterance is modified by identifying all instances of occurrence of mispronounced phoneme and the locations in the at least one speech utterance and applying correction at the identified locations.

2. The method as claimed in claim 1, wherein modifying the obtained at least one speech utterance using the at least one speech modification comprises of generating speech utterance data pertaining to healthy speech from the obtained at least one speech utterance.

3. A system, comprising:
one or more communication interfaces;
one or more hardware processors; and
one or more memory modules storing a plurality of instructions, wherein said plurality of instructions, when executed, cause the one or more hardware processors to:
obtain at least one speech utterance of a user as input; and
process the obtained at least one speech utterance, comprising:
compare the obtained at least one speech utterance with at least one deviation model;
determine a deviation level of the at least one speech utterance, based on the comparison with the at least one deviation model, wherein determining the deviation level comprises of:
extracting feature vectors from the obtained at least one speech utterance;
comparing the extracted feature vectors of the at least one speech utterance with feature vectors representing different levels of deviation stored in the at least one deviation model;
identifying a match for the feature vectors of the at least one speech utterance in the at least one deviation model;
identifying at least one type of deviation present in the at least one speech utterance, an extent of deviation of the at least one speech utterance from a healthy speech and locations of all deviations in the at least one speech utterance, based on the identified match; and
determining the deviation level of the at least one speech utterance as the deviation level corresponding to the identified match, wherein the deviation level comprises of:
(a) the identified at least one types of deviation present in the at least one speech utterance, wherein the at least one type of deviation is a type of speech disorder,
(b) the identified extent of deviation of the at least one speech utterance from a healthy speech, based on the at least one deviation model, wherein the at least one deviation model comprises of the feature vectors representing degree of deviation of speech signals at different severity levels of at least one speech disorder, and
(c) the identified locations of all the deviations in the at least one speech utterance;
determine at least one speech modification matching the determined deviation level of the at least one speech utterance; and
modify the obtained speech data in all the locations of the deviations, using the determined at least one speech modification, wherein the speech data is modified by identifying all instances of occurrence of mispronounced phoneme and the locations in the at least one speech utterance and applying correction at the identified locations.

4. The system as claimed in claim 3, wherein the system generates speech utterance data pertaining to healthy speech from the obtained at least one speech utterance by the system, by modifying the at least one speech utterance using the at least one speech modification.

5. A non-transitory computer readable medium embodying a plurality of instructions executable in a computing device for speech signal processing, comprising:
obtaining at least one speech utterance of a user as input, via one or more hardware processors; and
processing the obtained at least one speech utterance, via the one or more hardware processors, comprising:
comparing the obtained at least one speech utterance with at least one deviation model;
determining a deviation level of the at least one speech utterance, based on the comparison with the at least one deviation model, wherein the step of determining the deviation level comprises of:
extracting feature vectors from the obtained at least one speech utterance;
comparing the extracted feature vectors of the at least one speech utterance with feature vectors representing different levels of deviation stored in the at least one deviation model;
identifying a match for the feature vectors of the at least one speech utterance in the at least one deviation model;
identifying at least one type of deviation present in the at least one speech utterance, an extent of deviation of the at least one speech utterance from a healthy speech and locations of all deviations in the at least one speech utterance, based on the identified match; and
determining the deviation level of the at least one speech utterance as the deviation level corresponding to the identified match, wherein the deviation level comprises of:
(a) the identified at least one type of deviation present in the at least one speech utterance, wherein the at least one type of deviation is a type of speech disorder;
(b) the identified extent of deviation of the at least one speech utterance, wherein the at least one deviation model comprises of the feature vectors representing degree of deviation of speech signals at different severity levels of at least one speech disorder; and
(c) the identified locations of all the deviations in the at least one speech utterance;
determining at least one speech modification matching the determined deviation level of the at least one speech utterance; and
modifying the obtained speech utterance in all the locations of the deviations, using the determined at least one speech modification, wherein the speech utterance is modified by identifying all instances of occurrence of mispronounced phoneme and the locations in the at least one speech utterance and applying correction at the identified locations.

6. The non-transitory computer readable medium as claimed in claim 5, wherein modifying the at least one speech utterance using the at least one speech modification comprises of generating speech utterance data pertaining to healthy speech from the obtained at least one speech utterance.

* * * * *